United States Patent Office 3,330,459
Patented July 11, 1967

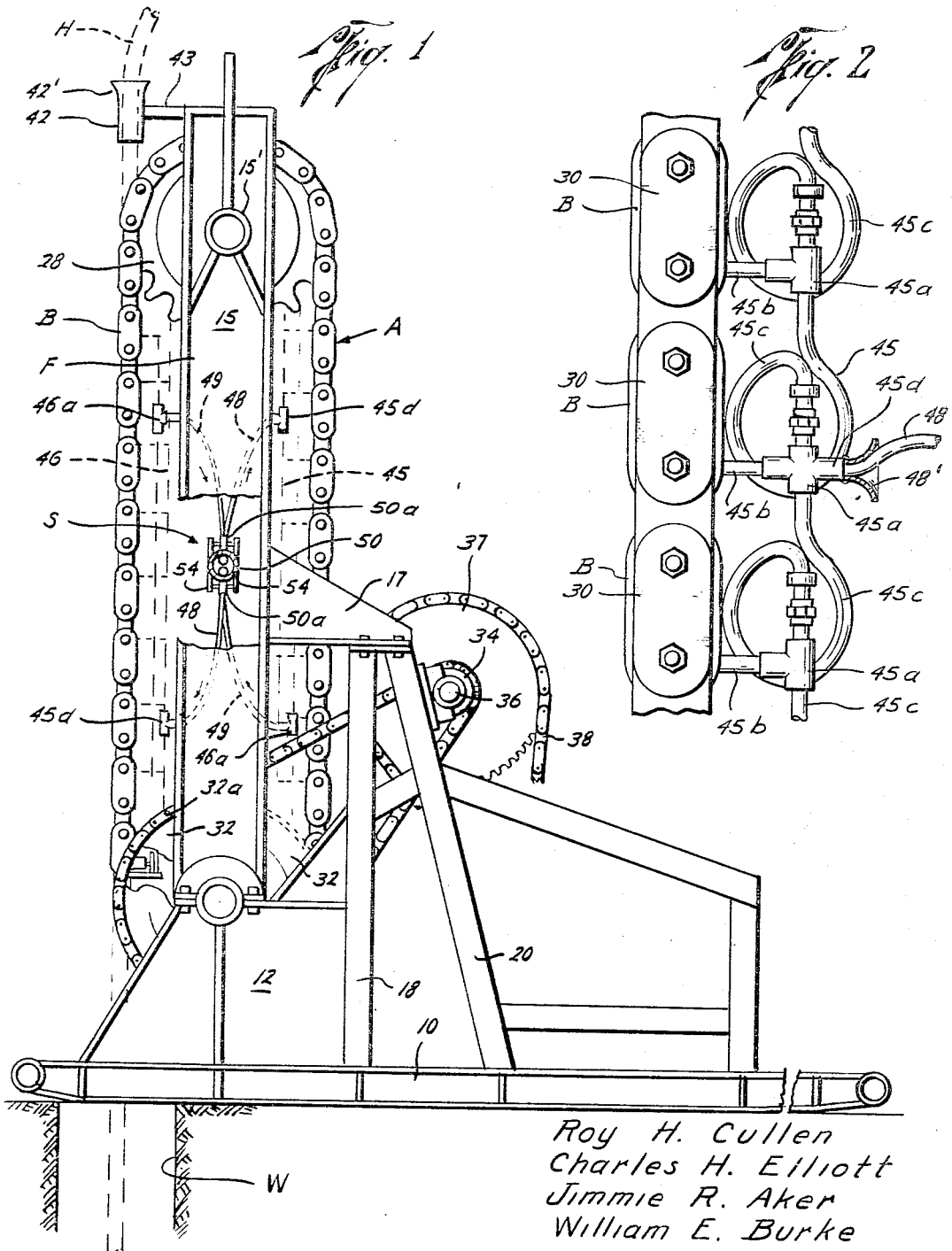

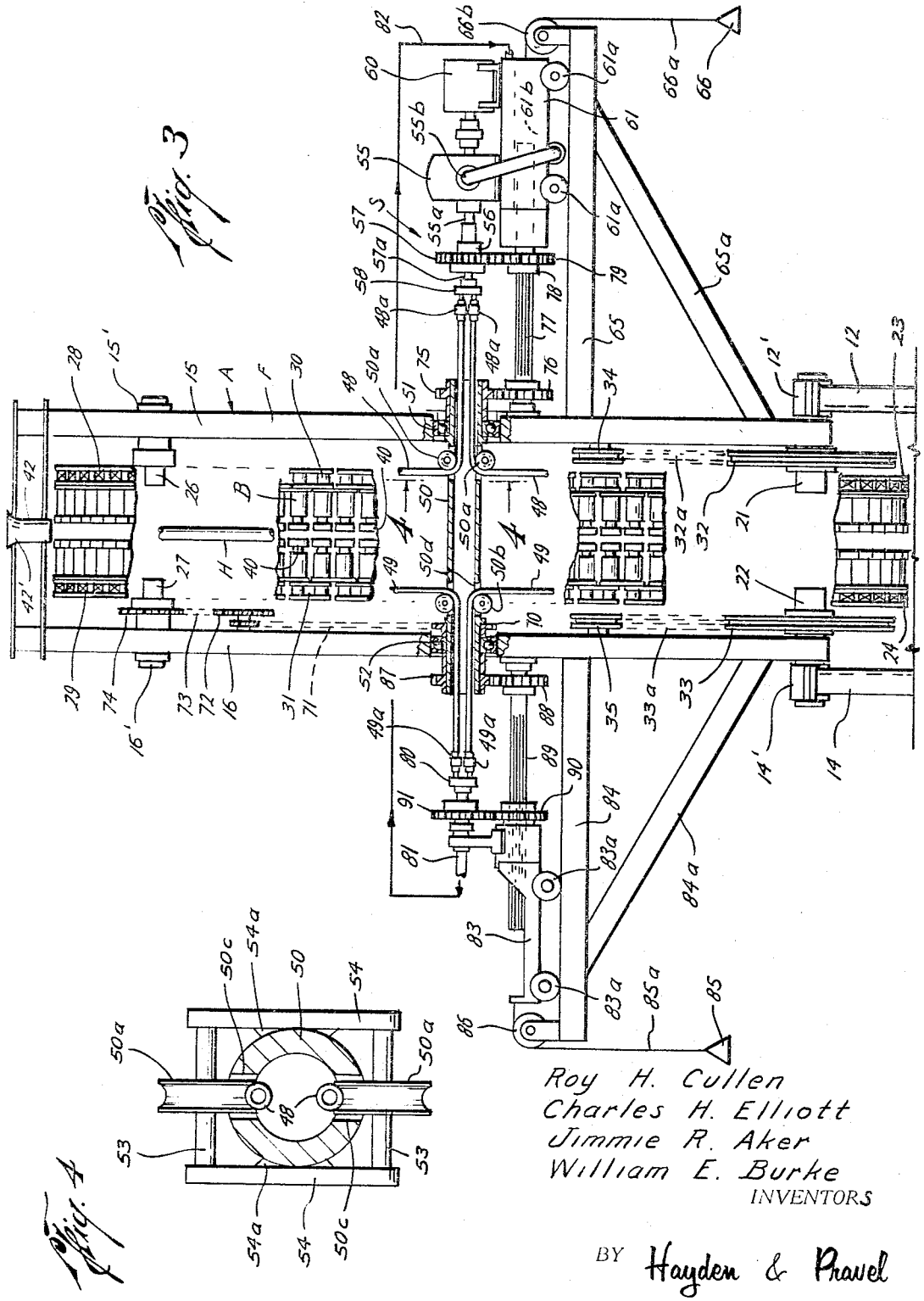

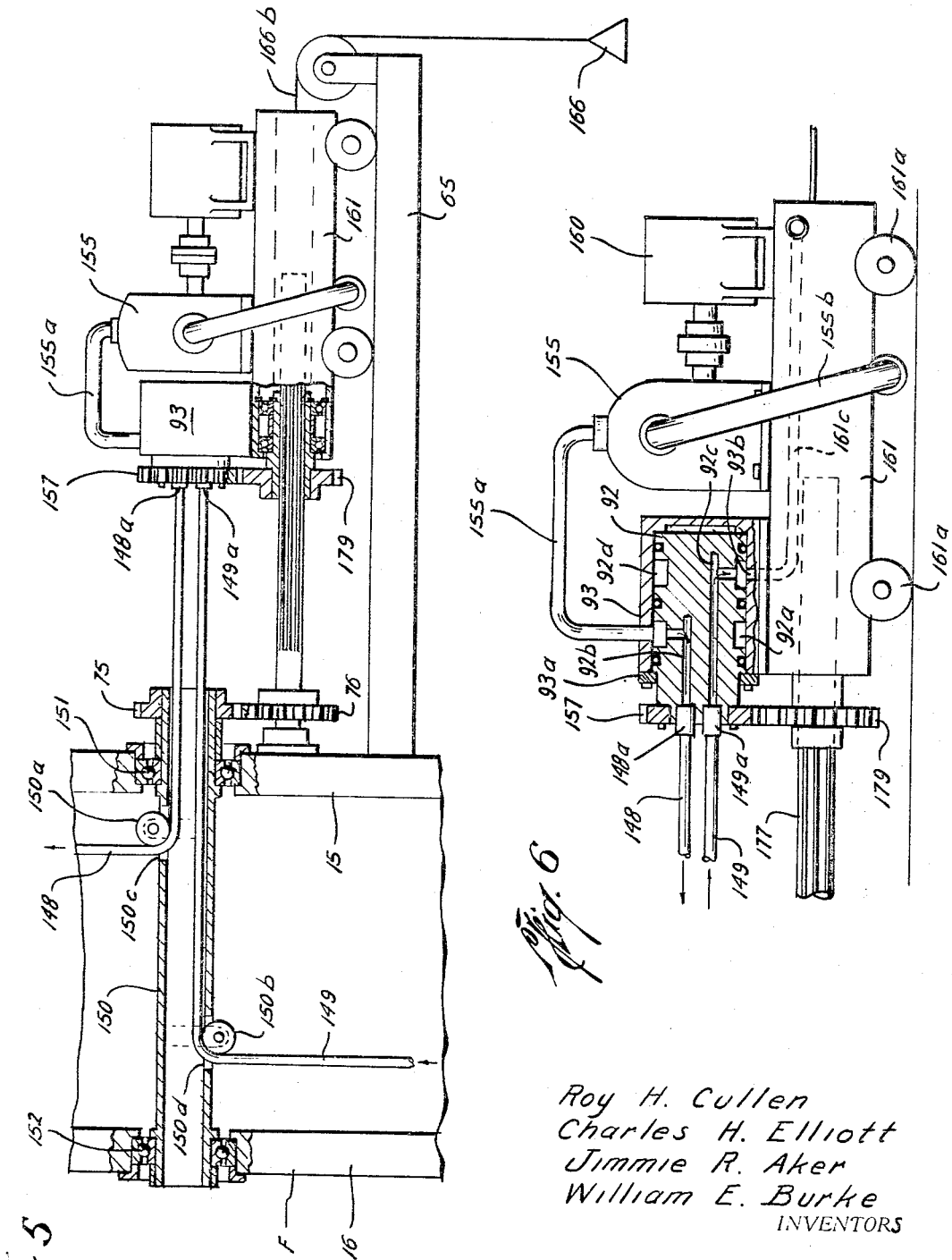

3,330,459
APPARATUS FOR HANDLING FLEXIBLE PIPE OR
SIMILAR ELONGATE MEMBERS
Roy H. Cullen, Suite 1931, 500 Jefferson Bldg., Houston,
Tex. 77002; Charles H. Elliott, Jimmie R. Aker, and
William E. Burke, Houston, Tex.; said Elliott, Aker,
and Burke assignors to said Cullen
Filed Sept. 30, 1965, Ser. No. 491,804
12 Claims. (Cl. 226—173)

This invention relates to new and useful improvements in apparatus for handling flexible pipe or similar elongate members.

In United States Patent No. 2,892,535, a retractor apparatus is disclosed for raising and lowering flexible pipe or similar elongate members, wherein a plurality of clamping or gripping devices are mounted as an endless chain with the gripping devices opening on the exterior side of the endless chain to receive the elongate member. In such apparatus, the clamping or gripping devices are actuated by fluid pressure supplied by means of a retractable hose reel system disposed internally of the endless chain.

It is an object of this invention to provide a new and improved apparatus for handling flexible pipe and similar elongate members which has all of the advantages of the apparatus of said Patent No. 2,892,535, and in addition thereto, is more rugged and is otherwise more suitable for heavy duty work such as encountered in ultra-deep drilling at well depths of more than twenty thousand feet.

An important object of this invention is to provide a new and improved apparatus for handling flexible pipe or similar elongate members wherein clamping or gripping devices for such flexible pipe are actuated by fluid pressure from a fluid pressure system which has its components spread out or displaced with respect to the gripping devices to provide for easy access to such fluid pressure system so as to facilitate inspection and repair.

Another object of this invention is to provide a new and improved apparatus for handling flexible pipe or similar elongate members wherein clamping or gripping devices for such flexible pipe are disposed in an endless chain and are actuated by fluid pressure from a fluid pressure system, and wherein such fluid pressure system has a fluid pressure source which is disposed externally of the endless chain and which is connected to a hose extending from the pressure source to the clamping or gripping devices, such fluid pressure source being movable to compensate for movements of the hose occurring as the endless chain moves in its endless path.

A particular object of this invention is to provide a new and improved apparatus for handling flexible pipe or similar elongate members wherein clamping or gripping devices for such flexible pipe are disposed in an endless chain and are actuated by fluid pressure from a fluid pressure system, and wherein such fluid pressure system has a fluid pump disposed externally of the endless chain and mounted for movement laterally with respect to the longitudinal axis of the endless chain.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is an elevation illustrating the preferred form of the apparatus of this invention;

FIG. 2 is a partial view of the endless chain of clamping devices and the endless hose system therewith;

FIG. 3 is a front view, partly in section and partly in elevation, with certain portions thereof removed, illustrating one form of the present invention having a moving fluid pressure system therewith;

FIG. 4 is a view taken on line 4—4 to illustrate certain details of the fluid pressure system of this invention;

FIG. 5 is a partial view, partly in elevation and partly in section, illustrating a modified form of the construction illustrated in FIG. 3; and FIG. 6 is an enlarged view of the fluid pressure pump or source illustrated in FIG. 5 and illustrating in particular certain details thereof.

In the drawings, the letter A designates generally the apparatus of this invention for handling a flexible pipe H or other similar elongate member. The apparatus A includes a plurality of clamping or gripping devices B which are connected together to form an endless chain, whereby the clamping devices are adapted to lower or hoist the flexible pipe H or a similar elongate member into and out of the well bore W, or other similar location, as will be explained. Briefly, the improvement in the apparatus A of this invention resides in a moving fluid pressure system S, which may take several forms as will be explained, and which supplies and exhausts fluid pressure with respect to the clamping or gripping devices B for successively gripping and releasing the elongate member H during the feeding thereof with the apparatus A.

Considering the invention more in detail, the apparatus A includes a frame F for supporting the endless chain of gripping or clamping devices B as such endless chain moves in an endless loop or path. The frame F includes a base or skid 10 upon which are mounted lower shaft supports 12 and 14. Extending upwardly from the lower shaft supports 12 and 14 are longitudinally extending upper shaft support members 15 and 16, respectively. Such frame members 15 and 16 are suitably braced and supported by plates 17, one of which is shown in FIG. 1, and brace members 18 and 20.

A pair of lower stub shafts 21 and 22 having lower sprockets 23 and 24, respectively, are suitably mounted in bearing assemblies 12' and 14', respectively. At the upper end of the endless chain of gripping devices B, stub shafts 26 and 27 are mounted in suitable bearing supports 15' and 16', respectively, and each of such shafts 26 and 27 has an upper sprocket 28 and 29, respectively, thereon. The sprockets 23 and 28 engage the chain links 30 on one side of the endless chain while the sprockets 24 and 29 engage the links 31 on the other side of the endless chain of gripping devices B. Power is supplied to the endless chain of gripping devices B to rotate same through any suitable means such as drive sprockets 32 and 33 to which are connected drive chains 32a and 33a, respectively, the other end of which are connected to suitable smaller sized sprockets 34 and 35. The sprockets 34 and 35 are driven by a shaft 36 upon which is also mounted a large gear 37 and to which is connected a drive chain 38 which extends to a drive engine, including suitable gear boxes and clutch controls (not shown) as will be understood by those skilled in the art.

Although various types of gripping devices B may be used with the present apparatus A, the type preferred is illustrated in detail in United States Patent No. 2,892,535, and each is constructed for operation with fluid pressure. Each of the clamping or gripping devices has a pair of laterally movable gripping members 40 (FIG. 3) which are adapted to move towards each other to engage and grip the flexible pipe or other elongate member H as the member H is moving throughout a longitudinal path as indicated in FIG. 1 in dotted lines. The gripping devices B open to separate and release from the flexible pipe H at the bottom of the left-hand longitudinal portion of the endless chain as seen in FIG. 1, when the flexible pipe H is being lowered into the well bore W. However, when the flexible pipe H is being hoisted or lifted from the well bore W, the gripping devices B are closed only in the longitudinal left-hand portion of the endless chain as illustrated in FIG. 1, and they are opened for releasing the hose or flexible pipe H at the upper extent of such longitudinal portion of the endless chain as illustrated in FIG. 1. The valve action for opening and closing such gripping or clamping devices B as illustrated in detail in United States Patent No. 2,892,535. It is to be noted that during the longitudinal feeding of the flexible pipe H either downwardly or upwardly throughout the longitudinal reach of the endless travel of the endless chain of the gripping devices B, a tubular guide 42 having an upper flared opening 42' is employed. Such guide 42 is supported on the frame F by a bar or plate 43 or other suitable means.

The present invention is particularly related to the fluid pressure system S which is especially suitable for use with the apparatus A, although it may be used in other instances wherein a plurality of moving stations correspond to the gripping devices B are employed. As illustrated in FIGS. 1–4 of the drawings, one form of the fluid pressure system S of this invention includes an endless supply hose 45 which is schematically illustrated in FIG. 1 as extending inwardly of the endless chain of gripping devices B. Also, another endless hose 46 for the exhaust or return of fluid pressure from the gripping devices B is disposed inwardly of the endless chain of gripping devices B as schematically illustrated in FIG. 1. Although each of the endless hoses 45 and 46 may be connected in various manners to the plurality of moving stations or gripping devices B, a detailed illustration of one type of endless hose is shown in FIG. 2 wherein a portion of the endless supply hose 45 is shown. Such endless supply hose 45 has a plurality of manifold connections 45a which connect with inlet tubes 45b to supply pressure fluid to the gripping devices B for moving them towards each other to grip the elongate member H at the proper time and position. Each of the manifold connections 45a is connected by a flexible hose section 45c, which together form the endless supply hose 45. One of the manifold connections 45a has a supply hose connection 45d formed therewith for connecting to a supply hose 48 (FIG. 2). In the typical case, it is desirable to have at least two of such supply hoses 48 as illustrated in FIGS. 1 and 3. To prevent an excessive bending of the flexible hose 48 at the connection 45d, a flared metal protector 48' is provided to limit the extent of the bending of the hose 48 so that it lies within the smooth inner surface of the protector 48' even a the most severe points of movement of the endless chain of gripping elements B.

The endless exhaust hose 46 has a similar construction to that illustrated and described in connection with the hose 45. Such hose 46 preferably has an exhaust hose 49 extending from a manifold 46a (FIG. 1); in the typical installation, two of such exhaust hoses 49 are employed as illustrated in FIG. 1.

Approximately in the center of the inner portion defined by the endless chain of gripping devices B, a rotating spindle 50 is mounted on suitable bearings 51 and 52 which are disposed on the upright frame sections 15 and 16, respectively. At each side of the spindle or tube 50, a pair of guide rollers 50a and 50b are mounted for receiving the supply hoses 49 and the exhaust hoses 50a, respectively. As best seen in FIG. 4, the pulleys 50a are mounted on pulley shafts 53 which in turn are secured to support plates 54 having connection with the exterior of the tube 50 by welds 54a or other suitablfe connecting means. The pulleys 50a are disposed in suitable slots 50c in the pipe 50 so that they extend into the bore of the spindle or tube 50 for guiding the ends of the supply hoses 48 from the area internally of the endless chain to a point externally thereof, as illustrated in FIG. 3. The pulleys 50b are mounted in a similar manner to the pulleys 50a as described above and each extends through a slot 50d in the pipe or spindle 50.

For supplying pressure fluid to the supply hoses 48, the external ends 48a of the hoses 48 are suitably secured by any conventional type of couplings to a pump 55 or other suitable fluid pressure source. The fluid under pressure from the pump 55 is discharged at an outlet pipe 55a into a main swivel 56 upon which is mounted a gear 57, the purpose of which will be hereinafter explained. The gear has a hollow passage therethrough and a tubular connection 57a to a header or adaptor 58 for supplying the fluid pressure to each of the external ends or couplings 48a for the hoses 48.

The pump 55 is operated by any suitable power means such as a motor 60. Both the motor 60 and the pump 55 are preferably disposed upon a movable base or tank 61 having wheels 61a thereon. Such wheels 61a are disposed on a platform or track 65 secured to the side of the frame F as best seen in FIG. 3. A suitable brace or brace means 65a is disposed below the track or platform 65.

Any suitable means may be provided for maintaining the fluid pressure hoses 48 taut at all times during the movements of the endless chain or grippers B. A relatively simple form of such means is illustrated in FIG. 3 of the drawings, wherein a weight 66 is suspended on a cable 66a which is attached to the tank 61. The cable 66a preferably passes over a pulley 66b disposed on the platform or track 65. Thus, the weight 66 exerts a force tending to move the tank 61 together with the pump 55 and motor 60 outwardly away from the endless chain of grippers, and such movement takes place when the line 48 tends to become slackened or loose. However, the weight 66 is overcome when the ends of the hoses 48 at the manifold connections 45d act to pull the hoses 48 inwardly and thus cause the tank or base 61 to move inwardly towards the endless chain. For example, when the uppermost supply hose connections 45d as shown in FIG. 1 moves upwardly from the position shown therein, it exerts a pull on the entire movable base 61 with the pump 55 and the motor 60 thereon to move same inwardly towards the endless chain. Such inward pulling occurs until the connection 45d reaches the uppermost point of travel of the endless chain and the downward movement thereof begins. While the uppermost connection 45d is moving upwardly from the position shown in FIG. 1, the lower most connection 45d is moving downwardly and exerts the same pulling force until it reaches the lowest point of the endless chain and begins its upward travel. Thus, when the upper connection 45d begins its downward travel and the lower connection 45d begins its upward travel, the supply lines 48 begin to slacken, but such slackening is prevented because the weight 66 pulls on the hoses 48 to maintain them taut by moving the pump 55 and the parts therewith on the base 61 outwardly away from the endless chain.

In order to prevent the hoses 48 from breaking under tension forces, they are preferably armored in any suitable manner to provide tension or end pull strength. A supplemental cable may be incorporated with each of the hoses 48 to provide such end pull strength if desired. In order to prevent a twisting of the ends of the hoses 48 projecting externally from the endless chain of grippers B, the pipe 50 is rotated in a relationship which is coordinated with the endless movement of the grippers B. Such coordinated movement of the tube or spindle 50 is accomplished by mounting a gear 70 on the spindle 50 with a chain 71 extending upwardly through a gear assembly 72 and a second chain 73 to a gear 74 on the stub shaft 16'. Thus, the rotation of the stub shaft 16' imparts rotation to the spindle 50 in a predetermined relationship depending upon the gear ratios of the connecting gear structure heretofore described.

At the outer end of the spindle 50, another gear 75 is secured to the spindle 50 and rotates therewith. Such gear 75 is in driving engagement with a gear 76 secured on a splined shaft 77. The splined shaft extends into an opening 61b within the tank 61 so that the tank 61 moves with respect to the shaft 77. It is understood that the tank surrounds the opening 61d and is sealed for holding the pressure fluid, as will be more evident hereinafter. A swivel mounting 78 is provided for a gear 79 which engages with the gear 57. The gear 79 is rotated with the splines on the shaft 77 but is longitudinally movable relative to such shaft 77. Thus, movements of the gear 75 which are obtained from the movement to the spindle 50 are transmitted through the gear 76, the shaft 77, the gear 79 to the gear 57 so that the ends 48a of the hoses 48 are rotated at a speed which prevents a twisting of such ends 48a during the endless travel of the endless chain of grippers B.

The exhaust hose lines 49 are mounted in an identical manner to that described in connection with the hoses 48 in that their external ends 49a are coupled to a header or adaptor 80 which is in communication with an outlet tube 81 which passes externally of the apparatus A and returns the pressure fluid to the tank 61 at inlet line 82, which has been shown schematically for illustration purposes. The pump 55 has a section line 55b connected to the tank 61 for using the pressure fluid when needed. Thus, there is a complete closed fluid pressure system provided with this apparatus.

The hoses 49 are kept taut in the same manner as explained in connection with the hoses 48 by the use of a movable base 83 mounted on wheels 83a which are disposed on a suitable platform or track 84. The platform or track 84 is attached to the frame F at the vertical upright 16 and is braced with an angular brace or braces 84a. A weight or other suitable means 85 is connected to the movable base 83 by a cable 85a which extends over a pulley 86 mounted on the platform 84.

In order to prevent the ends of the hoses 49 from becoming twisted, a gear 87 is mounted on the left-hand end of the spindle or rod 50 in the same manner as the gear 75 is disposed on the other end thereof as best seen in FIG. 3. The gear 87 meshes with a gear 88 mounted on a splined shaft 89 which has slidably mounted thereon a gear 90. The gear 90 engages with a gear 91 so that the rotation of the ends 49a of the hoses 49 is coordinated with the movements of the endless chain or grippers B to prevent a twisting of such ends 49a. Also, the platform 83 moves inwardly and outwardly with respect to the endless chain in response to pulling and slackening of the hoses 49 in the same manner as described heretofore in connection with the hoses 48. The hoses 49 are so provided with armoring or other means to provide sufficient end pull or tension strength as explained in connection with the hoses 48.

It should be understood that if the hoses 48 and 49 are made of a stiff enough material or stiffened by external or internal wrapping, the inherent stiffness of such hose will eliminate the necessity for the gears 75, 76, 79 and 57 with respect to the hoses 48, and the gears 52, 88, 90, and 91 with despect to the hoses 49. Likewise, the connecting shafts and other structure can be omitted in such cases. Also, the sprockets 70, 72 and 74 with their accompanying chains 71 and 73 may be omitted since the spindle 50 may be turned by the hoses 48 and 49 themselves.

The operation or use of the form of the invention illustrated in FIGS. 1–4 is believed evident from the foregoing, but briefly, such operations include the movement of the endless chain of grippers B in a direction for either lowering the flexible pipe H into the well bore W or raising it from such well bore W. By a rotation of the endless chain of grippers B in a counterclockwise direction as shown in FIG. 1, the flexible pipe H is lowered into the well bore W, and by a clockwise rotation of such endless chain, the hose or flexible pipe H is pulled upwardly. It is to be understood that the gripping members of each of the gripping devices B is in gripping engagement with the flexible pipe H while they are in the longitudinal reach at the forward portion of the endless chain, or the left-hand portion as illustrated in FIG. 1. The rest of the grippers B are open. The hydraulic fluid system S provides the means for supplying the hydraulic or other fluid pressure to the gripping devices B for opening and closing same at their particular stations where desired. It should be noted that the endless exhaust hose 46 is illustrated in FIG. 1 as displaced laterally with respect to the endless supply hose 45, for illustration purposes only, since it will be appreciated that the endless lines or hoses 45 and 46 do not overlap but instead are parallel to each other to prevent any entanglement of the supply and exhaust hoses 48 and 49 in their endless travel.

During the operation of the apparatus A, with the hoses 48 and 49 moving in the endless path with the endless chain, such hoses 48 and 49 are maintained taut at all times by reason of the movable pressure supply source 55, as previously explained. Since the pump 55 and the principal working parts of the fluid pressure supply system are disposed externally of the endless chain of grippers B, they may be made extremely rugged in construction and they are readily available for repair, inspection and replacement as necessary. For this reason, the apparatus of the present invention is particularly suitably for use in ultra deep drilling such as at depths of twenty thousand feet or more. However, it will be understood that the invention has application at lesser depths and the fluid pressure system S has utility in equipment other than the particular apparatus A illustrated in the drawings.

In FIGS. 5 and 6, a modified form of the present invention is illustrated wherein the fluid pressure system has only a single supply hose 148 and a single exhaust or return hose 149. A spindle or rotating tube 150 is provided in place of the spindle or tube 50 of FIGS. 1–4. Such spindle 150 has a pulley 150a mounted thereon adjacent an opening 150c for guiding the hose 148, and a pulley 150b is provided adjacent an opening 150d for guiding the hose 149. The spindle 150 is mounted in the frame F which includes the uprights 15 and 16 in the same manner as the spindle or tube 50, and suitable bearings 151 and 152 are therefore provided. Both the supply hose 148 and the exhaust or return hose 149 are directed to the same side of the endless chain as best seen in FIG. 5, so that the additional movable base 83 and the parts connected thereto as shown in FIG. 3 are eliminated with the form of the invention shown in FIG. 5.

The sprocket 70 is not illustrated in FIG. 5 since it may be omitted providing the hoses 148 and 149 are sufficiently rigid to impart rotation to the spindle 150 in the absence of the sprocket 70 and the drive connected therewith. However, it will be appreciated that such sprocket 70 of FIG. 3 and the connection from such sprocket 70 to the tub shaft 16' may be employed to rotate the spindle 150 if the hoses 148 and 149 are not sufficiently rigid to accomplish the rotation of the spindle 150. The ends of the hoses 148 and 149 are connected at 148a and 149a (FIG. 6) to a rotatable valve assembly 92 which is disposed within a valve housing 93. The valve 92 is rotatable within the housing 93 and is retained in there by any suitable means such as a removable retaining washer 93a mounted on the housing 93. A fluid pressure source or pump 155 is connected to the housing 93 through an outlet or discharge line 155a for introducing pressure fluid into an annular groove or passage 92a of the valve 92. Such passage 92a is in communication with a longitudinally extending passage 92b which connects with the bore of the hose 148 for transmitting pressure fluid to the gripping devices B which are being actuated for gripping or engaging the flexible pipe H. The exhaust or return line 149 is in communication with a longitudinal passage 92c which communicates with an annular passage 92d. The annular passage 92d communicates with an outlet opening 93b and a return line 161c within the tank 161. The suction line 155b of the pump 155 is in communication with the tank 161 for drawing pressure fluid therefrom so that a complete closed hydraulic or other pressure fluid system is provided.

Any suitable source of power such as the electric motor 160 is provided for driving the pump 155 as explained in connection with FIG. 3. The movable base or tank 161 corresponds with the movable base or tank 61 of FIG. 3 and includes wheels 161a for movement on a support or base such as 65 shown in FIGS. 3 and 5. The same mechanism is provided for controlling the inward and outward movements of the movable base 161 as heretofore described in connection with FIGS. 1–4, and it includes a weight 166 which is connected by the line 166b to the tank 161, or other suitable means such as a hydraulic ram. The splined shaft 177 corresponds with the shaft 77 of FIG. 3 and as illustrated such splined shaft 177 extends into a completely sealed off opening within the tank 161. It can be appreciated that the shaft 177 may pass to either side of any portion of the tank 161 and of course it does not enter into the fluid within the tank 161 nor provide any fluid opening, since it is merely for providing a relative longitudinal movement between the shaft 177 and the tank 161.

The gears 179 and 157 corresponds with the gears 79 and 57 of FIG. 3 and are operated in the same manner as described by gears 75 and 76 in connection with FIG. 3.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. An apparatus for handling an elongate member, comprising:
    (a) a plurality of clamping devices each of which has fluid pressure actuated gripping members to grip and release an elongate member,
    (b) means connecting said clamping devices together to form an endless chain with the gripping members opening on the exterior side of said endless chain to receive the elongate member,
    (c) fluid pressure means operatively connected with each of said clamping devices for selectively operating the gripping members of said clamping devices with pressure fluid to grip and release the elongate member,
    (d) said fluid pressure means including:
        (1) a fluid pressure source, and
        (2) hose means connecting said fluid pressure source to said clamping devices for the inlet of fluid pressure to the clamping devices being actuated for gripping the elongate member, and
    (e) means mounting said fluid pressure source for movement relative to said endless chain to compensate for movements of the hose occurring as said endless chain moves in its endless path.

2. An apparatus for handling an elongate member, comprising:
    (a) a plurality of clamping devices each of which has fluid pressure actuated gripping members to grip and release an elongate member,
    (b) means connecting said clamping devices together to form an endless chain with the gripping members opening on the exterior side of said endless chain to receive the elongate member,
    (c) fluid pressure means operatively connected with each of said clamping devices for selectively operating the gripping members of said clamping devices with pressure fluid to grip and release the elongate member,
    (d) said fluid pressure means including:
        (1) a fluid pressure source, and
        (2) a hose system having first hose means connecting said fluid pressure source to said clamping devices for the inlet of pressure fluid to the clamping devices being actuated for gripping the elongate member and also having second hose means for exhausting pressure fluid from the clamping devices being released from gripping engagement with the elongate member, and
    (e) means mounting said fluid pressure source for movement relative to said endless chain to compensate for movements of the hose occurring as said endless chain moves in its endless path.

3. An apparatus for handling an elongate member, comprising:
    (a) a plurality of clamping devices each of which has fluid pressure actuated gripping members to grip and release an elongate member,
    (b) means connecting said clamping devices together to form an endless chain with the gripping members opening on the exterior side of said endless chain to receive the elongate member,
    (c) fluid pressure means operatively connected with each of said clamping devices for selectively operating the gripping members of said clamping devices with pressure fluid to grip and release the elongate member,
    (d) said fluid pressure means including:
        (1) a fluid pressure source,
        (2) an endless fluid hose connected to said clamping devices and disposed inwardly of the endless chain formed thereby, and
        (3) a supply hose having one end thereof connected to said endless fluid hose and the other end thereof connected to said fluid pressure source for supplying pressure fluid to the clamping devices being actuated for gripping the elongate member, and
    (e) means mounting said fluid pressure source externally of said endless chain for movement relative thereto to compensate for movements of said one end of said supply hose occurring as said endless chain moves in its endless path.

4. An apparatus for handling an elongate member, comprising:
    (a) a plurality of clamping devices each of which has fluid pressure actuated gripping members to grip and release an elongate member,
    (b) means connecting said clamping devices together to form an endless chain with the gripping members opening on the exterior side of said endless chain to receive the elongate member,
    (c) fluid pressure means operatively connected with each of said clamping devices for selectively operating the gripping members of said clamping devices with pressure fluid to grip and release the elongate member,
    (d) said fluid pressure means including:
        (1) a fluid pressure source,
        (2) an endless fluid hose connected to said clamping devices and disposed inwardly of the endless chain formed thereby, and
        (3) a supply hose having one end thereof connected to said endless fluid hose and the other end thereof connected to said fluid pressure source for supplying pressure fluid to the clamping devices being actuated for gripping the elongate member, and
    (e) means mounting said fluid pressure source externally of said endless chain, and
    (f) means for applying a force to said fluid pressure source in a direction away from said endless chain to move said fluid pressure source with respect to said endless chain to the extent needed to maintain said supply hose taut as the endless chain moves in its endless path.

5. An apparatus for handling an elongate member, comprising:
   (a) a plurality of clamping devices each of which has fluid pressure actuated gripping members to grip and release an elongate member,
   (b) means connecting said clamping devices together to form an endless chain with the gripping members opening on the exterior side of said endless chain to receive the elongate member,
   (c) fluid pressure means operatively connected with each of said clamping devices for selectively operating the gripping members of said clamping devices with pressure fluid to grip and release the elongate member,
   (d) said fluid pressure means including:
      (1) a pump for supplying fluid pressure,
      (2) an endless fluid hose connected to said clamping devices and disposed inwardly of the endless chain formed thereby, and
      (3) a supply hose having one end thereof connected to said endless fluid hose and the other end thereof connected to said pump for supplying pressure fluid to the clamping devices being actuated for gripping the elongate member,
   (e) a track disposed to one side of the side opening of the internal area confined by the endless chain, and
   (f) means mounting said pump on said track for movement relative to said endless chain to compensate for movements of said one end of said supply hose occurring as said endless chain moves in its endless path.

6. An apparatus for handling an elongate member, comprising:
   (a) a plurality of clamping devices each of which has fluid pressure actuated gripping members to grip and release an elongate member,
   (b) means connecting said clamping devices together to form an endless chain with the gripping members opening on the exterior side of said endless chain to receive the elongate member,
   (c) fluid pressure means operatively connected with each of said clamping devices for selectively operating the gripping members of said clamping devices with pressure fluid to grip and release the elongate member,
   (d) said fluid pressure means including:
      (1) a fluid pressure source,
      (2) an endless fluid hose connected to said clamping devices,
      (3) an endless fluid exhaust hose connected to said clamping devices,
      (4) a supply hose having one end thereof connected to said endless fluid supply hose and the other end thereof connected to said pump for supplying pressure fluid to the clamping devices being actuated for gripping the elongate member,
      (5) a pressure fluid receiver for receiving fluid discharged from the clamping devices into said endless fluid exhaust hose, and
      (6) an exhaust hose having one end thereof connected to said endless fluid exhaust hose and the other end thereof connected to said fluid receiver, and
   (e) means mounting said pump and said receiver externally of said endless chain for movement relative to said endless chain to compensate for movements of said one end of said supply hose and said one end of said exhaust hose occurring as said endless chain moves in its endless path.

7. A moving fluid pressure supply system, comprising:
   (a) an endless flexible fluid hose,
   (b) means for moving said hose in an endless loop,
   (c) manifold connections in said endless hose for conducting fluid pressure therein at a plurality of moving stations,
   (d) a supply connection in said endless hose,
   (e) a fluid pressure source for supplying fluid pressure,
   (f) a supply hose extending between said fluid pressure source and said supply connection throughout the movement of said supply connection around said endless loop, and
   (g) means mounting said fluid pressure source for movement relative to said endless hose to compensate for movements of said supply hose as the endless hose moves in its endless loop.

8. A moving fluid pressure exhaust system, comprising:
   (a) an endless flexible fluid hose,
   (b) means for moving said hose in an endless loop,
   (c) manifold connections in said endless hose for discharging pressure fluid therefrom at a plurality of moving stations,
   (d) an exhaust fluid connection in said endless hose,
   (e) a fluid receiver,
   (f) an exhaust hose extending between said fluid receiver and said exhaust fluid connection throughout the movement of said connection around said endless loop, and
   (g) means mounting said receiver for movement relative to said endless hose to compensate for movements of said exhaust hose as the endless hose moves in its endless loop.

9. A moving fluid pressure system, comprising:
   (a) a plurality of endless flexible fluid hoses,
   (b) means for moving said hoses together in an endless loop,
   (c) manifold connections in each of said endless hoses for communicating fluid at a plurality of moving stations,
   (d) a connector hose connected to each of said hoses inwardly of said endless loop and projecting externally thereof,
   (e) a pump connected to at least one of said hoses for supplying fluid pressure thereto, and
   (f) means mounting the external ends of said connector hoses for movement relative to said endless hoses to maintain the connector hoses taut throughout of the movement of the endless hoses in their endless loop.

10. A moving fluid pressure supply system, comprising:
    (a) an endless flexible hose,
    (b) means for moving said hose in an endless loop,
    (c) manifold connections in said endless hose for conducting fluid pressure therein at a plurality of moving stations,
    (d) a supply connection in said endless hose,
    (e) a fluid pressure source for supplying fluid pressure,
    (f) a supply hose extending between said fluid pressure source and said supply connection throughout the movement of said supply connection around said endless loop,
    (g) means mounting said fluid pressure source for movement towards said endless hose in response to pulling force exerted on said supply hose as the endless hose moves in its endless loop, and
    (h) means for moving said fluid pressure source away from said endless hose in response to a slackening of the supply hose as the endless hose moves in its endless loop, whereby the supply hose is maintained taut at all times during the movement of the endless hose in its endless loop.

11. An apparatus for handling an elongate member, comprising:
    (a) a plurality of clamping devices each of which has fluid pressure actuated gripping members to grip and release an elongate member, (b) means connecting said clamping devices together to form an endless chain with the gripping members opening on the exterior side of said endless chain to receive the elongate member,
(c) fluid pressure means operatively connected with each of said clamping devices for selectively operating the gripping members of said clamping devices with pressure fluid to grip and release the elongate member,
(d) said fluid pressure means including:
 (1) a fluid pressure source,
 (2) an endless fluid hose connected to said clamping devices and disposed inwardly of the endless chain formed thereby, and
 (3) a supply hose having one end thereof connected to said endless fluid hose and the other end thereof connected to said fluid pressure source for supplying pressure fluid to the clamping devices being actuated for gripping the elongate member,
(e) guide means disposed intermediate the ends of the supply hose for directing the hose from the area confined by said endless chain to a point externally thereof,
(f) means for rotating said guide means as the endless chain moves in its endless path to inhibit twisting of the supply hose, and
(g) means mounting said fluid pressure source externally of said endless chain for movement relative thereto to compensate for movements of said one end of said supply hose occurring as said endless chain moves in its endless path.

12. An apparatus for handling an elongate member, comprising:
(a) a plurality of clamping devices each of which has fluid pressure actuated gripping members to grip and release an elongate member,
(b) means connecting said clamping devices together to form an endless chain with the gripping members opening on the exterior side of said endless chain to receive the elongate member,
(c) fluid pressure means operatively connected with each of said clamping devices for selectively operating the gripping members of said clamping devices with pressure fluid to grip and release the elongate member,
(d) said fluid pressure means including:
 (1) a fluid pressure source,
 (2) an endless fluid hose connected to said clamping devices and disposed inwardly of the endless chain formed thereby, and
 (3) a supply hose having one end thereof connected to said endless fluid hose and the other end thereof connected to said fluid pressure source for supplying pressure fluid to the clamping devices being actuated for gripping the elongate member,
(e) means mounting said fluid pressure source externally of said endless chain for movement relative thereto to compensate for movements of said one end of said supply hose occurring as said endless chain moves in its endless path, and
(f) means for preventing said other end of said supply hose from becoming twisted as the endless chain moves in its endless path.

References Cited

UNITED STATES PATENTS

| | | | |
|---|---|---|---|
| 2,866,474 | 12/1958 | Gummere et al. | 137—580 X |
| 2,892,535 | 6/1959 | Cullen et al. | 226—173 |
| 3,184,328 | 5/1965 | Wagner et al. | 137—355.23 X |
| 3,191,522 | 6/1965 | Drake et al. | 226—173 X |

M. HENSON WOOD, JR., *Primary Examiner.*

A. N. KNOWLES, *Examiner.*